(12) United States Patent  
Ferianz

(10) Patent No.: US 7,853,008 B2
(45) Date of Patent: Dec. 14, 2010

(54) SUPPLY CIRCUIT FOR SUPPLYING A TWO-WIRE LINE

(75) Inventor: Thomas Ferianz, Bodensdorf (AT)

(73) Assignee: Lantiq Deutschland GmbH, Neubiberg (DE)

( * ) Notice: Subject to any disclaimer, the term of this patent is extended or adjusted under 35 U.S.C. 154(b) by 1408 days.

(21) Appl. No.: 11/294,211

(22) Filed: Dec. 5, 2005

(65) Prior Publication Data

US 2006/0133601 A1 Jun. 22, 2006

(30) Foreign Application Priority Data

Dec. 8, 2004 (DE) .................. 10 2004 059 153

(51) Int. Cl.
*H04M 1/00* (2006.01)
*H04M 9/00* (2006.01)
(52) U.S. Cl. .................. 379/413; 379/398
(58) Field of Classification Search ............ 379/413, 379/398
See application file for complete search history.

(56) References Cited

U.S. PATENT DOCUMENTS 4,317,963 A * 3/1982 Chea, Jr. ................ 379/377
6,647,114 B1 11/2003 Sacca
7,260,214 B2 * 8/2007 Enriquez et al. ............ 379/413

FOREIGN PATENT DOCUMENTS

EP 0884859 12/1998

OTHER PUBLICATIONS

German Office Action dated Sep. 29, 2005.

* cited by examiner

*Primary Examiner*—Alexander Jamal
(74) *Attorney, Agent, or Firm*—Slater & Matsil, L.L.P.

(57) ABSTRACT

A supply circuit for supplying a two-wire line comprises a first resistor connected between a first supply voltage potential and a first two-wire line connection of a two-wire line, a current-limiting device connected between a second two-wire line connection of the two-wire line and a second supply voltage potential and providing the two-wire line with a limited current on the basis of a variable setting potential, and an impedance-matching device connected between the second two-wire line connection and the second supply voltage potential and providing the variable setting potential on the basis of a reference potential and a voltage across the current-limiting device. The first resistor has a first impedance and the impedance-matching device and the current-limiting device form a second impedance being present at the second two-wire connection. The first and second impedances are essentially the same.

15 Claims, 3 Drawing Sheets

SUPPLY CIRCUIT FOR SUPPLYING A TWO-WIRE LINE

BACKGROUND OF THE INVENTION

1. Field of the Invention

The present invention relates to an impedance-matched supply circuit for supplying a two-wire line and to a multi-channel supply circuit, in particular for supplying power to subscriber devices in telecommunications networks.

2. Description of the Prior Art

Typical telephone networks are generally constructed from two-wire lines which serve both to supply power to connected terminals and to transmit signals. Even relatively recent ISDN systems need power to be supplied at the exchange end in order to operate the network terminations at the subscriber end. The supply voltage applied to a two-wire line is usually 100 volts, this voltage and the resultant current being supplied by the exchange.

When supplying power, particular requirements are imposed on maximum currents and the symmetry of the two lines forming the two-wire line. In order to satisfy all of the technical requirements, the relevant supply circuits must limit the current which is injected into the corresponding subscriber loop.

A circuit which is typically used to supply power is illustrated in FIG. 3.

FIG. 3 illustrates a circuit arrangement IPC for supplying a two-wire subscriber line TL in accordance with the prior art. In this case, a first line connection OUT1' of the two-wire line TL is coupled to earth GND via a first resistor R1. A second two-wire line connection OUT2' is connected to a supply voltage potential VBAT via the controllable path D-S of a transistor T1 and via a second resistor R4. The transistor T1 has a source, a drain, a bulk and a gate connection G, S, B, D, the drain connection D being connected to the second two-wire line connection OUT2' and the bulk and source connections B, S being connected to the second resistor R4. Provision is also made of an operational amplifier (OP1) which has two inputs E1, E2 and an output A. The output A is connected to the gate connection G of the transistor T1. A setting potential VR1 is supplied to the first input E1, and the second input E2 is connected to a circuit node K between the source connection S of the transistor T1 and the second resistor R4.

In general, the first and second resistors R1, R4, the transistor T1 and the operational amplifier OP1 are integrated, and the actual two-wire line TL is connected to the supply circuit IPC via a respective resistor R2, R3. In the case of ISDN applications, the current intensity which is injected into the subscriber loop TL must be limited to approximately 50 mA. This is effected, in the case of the circuit IPC in accordance with the prior art, by controlling the channel resistance of the transistor T1 by applying a control voltage to the gate connection G of the latter. In this case, said control voltage is provided by the operational amplifier OP1 which receives the voltage dropped across the controllable path D-S of the transistor T1 at the line node K as an input signal and compares it with a setting potential VR1.

In the case of telephone line networks, in particular, a particular requirement is additionally imposed on the symmetry of the currents which are present. By way of example, it is necessary for the impedance between earth GND and the positive first line connection OUT1 of the subscriber line to be equal to the impedance between the second line connection OUT2 of the subscriber line and the second supply voltage potential VBAT.

In the case of telephone networks, the second supply voltage potential is generally −100 volts. In the case of ISDN, the two impedances connected to the respective two-wire line must amount to an absolute value of, as precisely as possible, 28 Ω. In this case, the tolerance must not be more than 0.4 Ω in accordance with the system requirements. In the case of a circuit in accordance with the prior art, the symmetry in the corresponding impedances can only be achieved if, in particular, the channel resistance of the transistor T1 is only approximately 1 Ω since the temperature dependence of the channel resistance and manufacturing tolerances prevent the precise symmetry required in the case of relatively high resistance values for the controllable path.

On account of this requisite low resistance of only 1 106 in this example, a circuit arrangement in accordance with the prior art occupies a very large chip area. The comparatively large dimensions of the transistor T1 having a low resistance also lead to a high capacitance between the gate and drain or source. As a result, the current is limited relatively sluggishly. The disadvantages of such a basic circuit in accordance with the prior art thus reside, in particular, in the sluggish current-limiting behaviour and in the considerable outlay in terms of area in order to achieve the tolerances required in the symmetry of the impedances.

SUMMARY OF THE INVENTION

It is an object of the present invention to provide a supply circuit for supplying a two-wire line, which supply circuit necessitates a low outlay in terms of area and circuitry and has an impedance which is as symmetrical as possible as regards the individual lines which form the two-wire line.

The object of the present invention is achieved by means of an impedance-matched supply circuit for supplying a two-wire line, the supply circuit comprising:

a) a resistor which is connected between a first supply voltage potential and a first two-wire line connection of the two-wire line;

b) a current-limiting device which is connected between a second two-wire line connection of the two-wire line and a second supply voltage potential and provides the two-wire line with a limited current on the basis of a variable setting potential;

c) the variable setting potential being provided by an impedance-matching device on the basis of a reference potential and a voltage which is dropped across the current-limiting device, the impedance-matching device being connected between the second two-wire line connection and the second supply voltage potential; and d) the impedance (which is connected to the second two-wire line connection) of the current-limiting device and of the impedance-matching device essentially being the same as the impedance of the resistor.

A fundamental idea of the inventive supply circuit is to supply the current-limiting device with a variable setting potential which is provided by the impedance-matching device. Since it is likewise connected between the second two-wire line connection and the second supply voltage potential, this impedance-matching device synthesizes the connected impedance in such a manner that it corresponds to the resistor which is connected between the first supply voltage potential and the first two-wire line connection. This matched or synthesized impedance makes it possible, in particular, for the actual current-limiting device to be designed to be smaller, thus reducing the outlay in terms of area in comparison with the prior art during implementation.

In a restricted version of the inventive supply circuit, the current-limiting device is provided with a first transistor having a controllable path and a gate connection, the controllable path being connected between the second two-wire line connection and, via a first resistor, the second supply voltage potential, and the current-limiting device having a first differential amplifier having a first input, a second input and an output. In this case, the first input is connected to the setting potential, and the second input is connected to a first line node between the controllable path of the first transistor and the first further resistor. The output is connected to the gate connection of the first transistor. The current-limiting device essentially corresponds to the functional components which are known in accordance with the prior art. However, the inventive impedance-matching device makes it possible, in particular, for the first transistor to be designed to be considerably smaller and to have a higher resistance than in the case of supply circuits in accordance with the prior art. This leads to a considerably reduced space requirement of the entire circuit.

In another restricted version of the inventive supply circuit, the impedance-matching device has a second transistor having a controllable path and a gate connection, the controllable path being connected to a second line node between a second further resistor which is connected to the second two-wire line connection and a third further resistor which is connected to the second supply voltage potential. The impedance-matching device also has a second differential amplifier having a first input, a second input and an output, the first input being connected to the second line node, the second input being connected to a reference potential, and the output being connected to the gate connection of the second transistor. In this case, it is possible for the setting potential to be tapped off at the second line node. These few additional components in the inventive impedance-matching device may provide, in a simple manner, a synthesized impedance between the second two-wire line connection and the second supply voltage potential. The inventive connection of the transistor, the resistors and the differential amplifier in the impedance-matching device provides a particularly reliable synthesized impedance which is symmetrical to the first resistor.

The transistors may be in the form of normally off IGFET transistors.

In a further restricted version of the inventive supply circuit, the supply circuit is completely integrated on a chip. The advantages of the inventive supply circuit are manifested here, particularly in the case of integration on a semiconductor chip, since the ability to form comparatively high-value channel resistances of the transistors enables a particularly compact design, which is expedient in terms of area, on a chip.

The two-wire line may preferably be a telephone line. The resistors may preferably be dimensioned in such a manner that the impedance connected to the first and second two-wire line connections is then respectively essentially 28 Ω. The first transistor preferably has a channel resistance of at least 5 Ω. It is particularly advantageous if the resistors and the channel resistances of the transistors are selected in such a manner that the current flowing through the two-wire line or the subscriber loop is, at most, 50 mA, the voltage between the first and second supply voltage potentials being 100 volts. This selection of the resistances, impedance voltages and maximum currents essentially corresponds to the requirements imposed on ISDN supply circuits.

The supply circuit may be coupled to the respective two-wire line connections via a respective discrete coupling-in resistor.

The object is also achieved in accordance with the invention by means of a multi-channel supply circuit having a plurality of inventive impedance-matched supply circuits, the supply circuits being connected in parallel for the purpose of supplying limited currents to a plurality of two-wire lines.

It is then particularly advantageous for the multi-channel supply circuit to be completely integrated on a chip and for it to be particularly suitable for operation in an ISDN network. The advantages of the low outlay on the transistors, in particular, are obtained particularly in integrated supply circuit ICs for a large number of subscriber lines.

DESCRIPTION OF THE PREFERRED EMBODIMENTS

In the figures, unless specified otherwise, identical or functionally identical components are provided with the same reference symbols.

Figure 1:
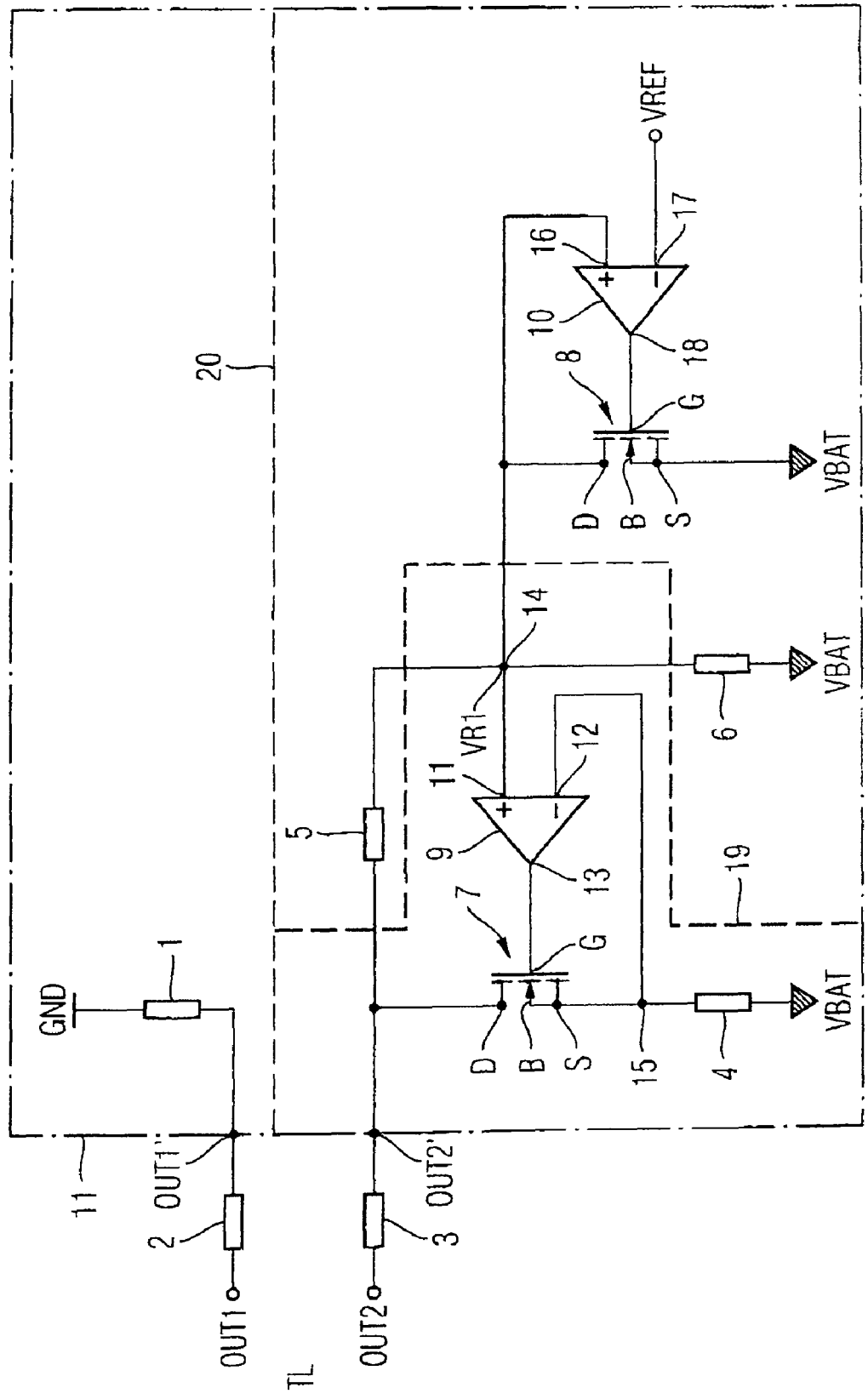
FIG. 1 is an exemplary embodiment of an inventive supply circuit.

FIG. 1 shows an inventive impedance-matched supply circuit for supplying a two-wire line.

The impedance-matched supply circuit 11 has a first two-wire line connection OUT1' and a second two-wire line connection OUT2'. The first two-wire line connection OUT1' is coupled, via a first resistor 1, to a first supply voltage potential GND which is earth in the example under consideration here. The first two-wire line connection OUT1' is connected to the line OUT1 of the two-wire line TL via a first discrete coupling-in resistor 2, and the second two-wire line connection OUT2' is connected to the line OUT2 of the two-wire line TL via a second discrete coupling-in resistor 3.

Provision is made of a current-limiting device 19 which is connected between the second two-wire line connection OUT2' and a second supply voltage potential VBAT (which is designed, in this case, as a battery voltage of −100 volts) and provides a controllable path D-S of a first transistor 7 and a first further resistor 4. The first transistor 7 which is in the form here of a MOSFET, for example, has a gate connection G, a drain connection D, a bulk connection B and a source connection S.

The current-limiting device 19 also has a first operational amplifier 9 having is a first input 11, a second input 12 and an output 13. The output 13 is connected to the gate connection G of the first transistor 7. The voltage which is applied to a first line node 15 (which is located between the controllable path DS of the first transistor 7 and the first further resistor 4) drops and is led to the second input 12 of the first operational amplifier 9. A setting potential VR1 which is applied to a second line node 14 is connected to the first input 11 of the first operational amplifier 9.

This variable setting potential VR1 at the second line node 14 is provided by an impedance-matching device 20. This impedance-matching device 20 has a second further resistor 5 and a third further resistor 6 which are connected in series between the second two-wire line connection OUT2' and the second supply voltage potential VBAT. The line node 14 is located between the second and third further resistors 5, 6. The controllable path D-S of a second transistor 8 is connected, in the impedance-matching device 20, between the second line node 14 and the second supply voltage potential VBAT. This second transistor 8 has a gate connection G, a drain connection D, a bulk connection B and a source connection S.

Provision is also made of a second operational amplifier 10 having a first input 16, a second input 17 and an output 18. The output 18 of the second operational amplifier 10 is connected to the gate connection G of the second transistor 8. The first input 16 of the second operational amplifier 10 is coupled to the second line node 14, and a reference potential VREF is led to the second input 17 of the second operational amplifier 10.

In the inventive supply circuit 11, the first transistor 7 is driven by the feedback resistors 5, 6 in such a manner that it is not the channel resistance of the controllable path D-S between the second connection OUT2' and the second supply voltage potential VBAT that appears but rather the synthesized impedance $R_s=(R_5/R_6)R_4$, $R_i$ respectively denoting the resistance values of the resistors i=4, 5, 6.

When integrating the inventive supply circuit 11, the same types of resistor are preferably used for the first resistor 1 and the first further resistor 4; these are in the form of a polysilicon resistor, for example. The symmetry which can be achieved and is required in the supply currents between GND and OUT1' or OUT2' and between VBAT and OUT2' or OUT2 depends on balancing (which can be precisely set) of the resistors $R_5/R_6$ and $R_1R_4$. The discrete, externally formed resistors 2, 3 are not critical for this symmetry in the connected impedance.

Some exemplary values of the resistance values $R_i$, i=1, 4, 5, 6, which are suitable when the inventive supply circuit 11 is used to supply power to ISDN two-wire lines are specified below. A ratio of $R_5/R_6=2$ and a typical $R_4=4\ \Omega$ result in a synthesized impedance $R_s$ of 8 $\Omega$. So that, at the two connections for OUT1, OUT2 for the two-wire line TL, the proportion of integrated resistance and external discrete resistance is constant at the two connections, $R_1=R_4+R_s=R_4(1+R_5/R_6)$ is also matched. In order to achieve these conditions over a wide temperature range and to keep influences of the manufacturing tolerance of the first transistor 7, 8 acceptable, the nominal channel resistance or the resistance of the controllable path of the first transistor 7 must be only approximately 5 $\Omega$. Compared with the prior art, the first transistor 7 occupies only one fifth of the previously required area. The area of the entire circuit arrangement 11 for supplying a two-wire line can thus be practically halved.

In addition to impedance matching, the inventive supply circuit 11 limits the voltage or current through the subscriber loop TL using the second transistor 8 and the second operational amplifier 10. The second transistor 8 and the second operational amplifier 10 limit the voltage at the first (positive) input 11 of the first operational amplifier 9 to the value of the reference potential VREF at the (negative) second input 17 of the second operational amplifier 10. The maximum current through the controllable path of the first transistor 7 is thus limited to the value $I_{max}=VREF/R_4$.

Since the gate-source capacitance of the first transistor 7 is very small on account of its small area in comparison with the prior art, current limitation for the subscriber loop TL responds very rapidly. In the event of the load resistor in the subscriber loop breaking down rapidly or, in the extreme case, in the event of a short circuit, the first transistor 7 is thus protected from thermal destruction.

As a result of the synthesized impedance $R_s$ which is calculated according to the invention, manufacturing tolerances of the first transistor 7 can thus be controlled in an improved manner, the transistor can be designed to be smaller and, on the one hand, can thus be integrated in a more expedient manner in terms of area and, on the other hand, has a faster response behaviour to current limitation.

Figure 2:
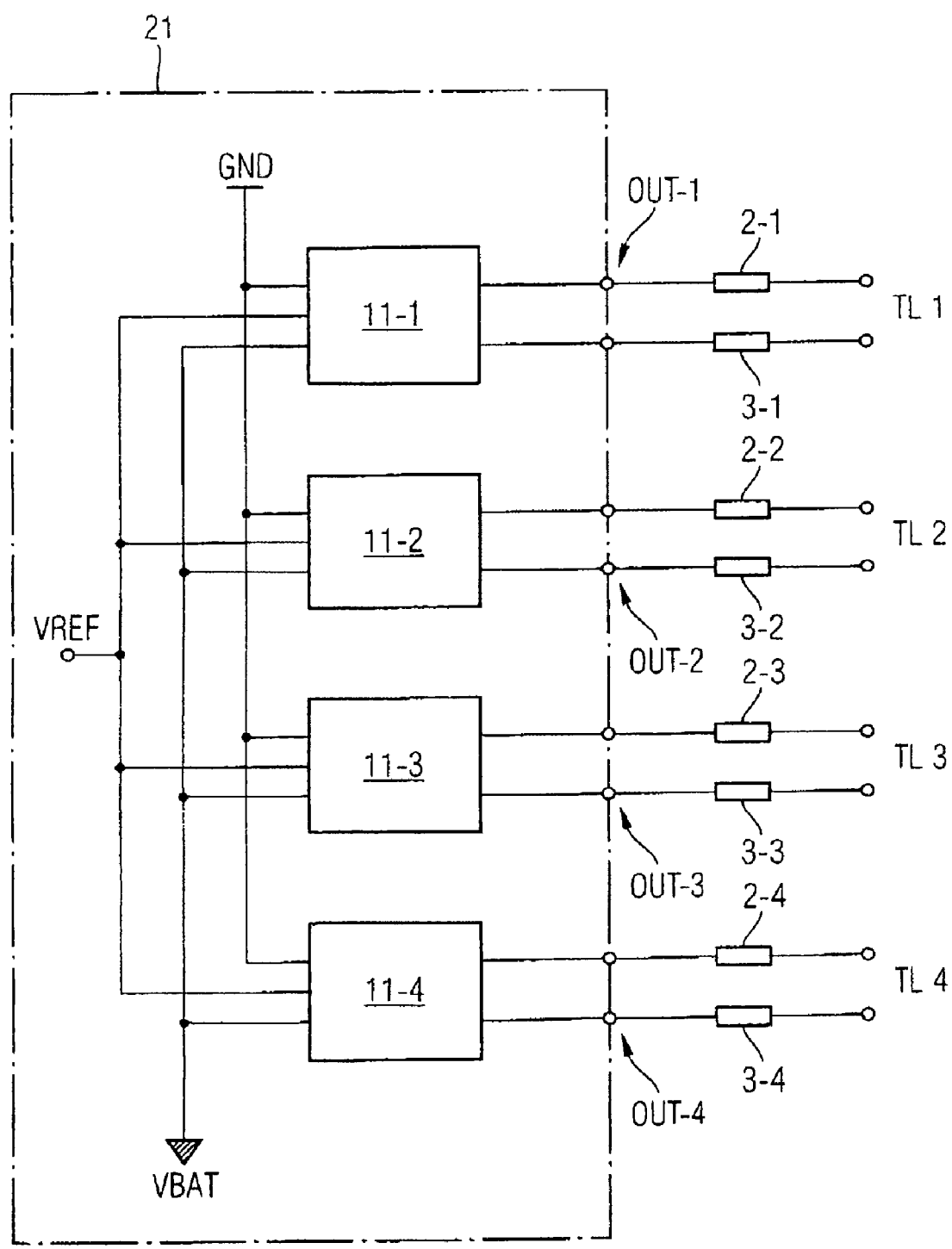
FIG. 2 is an exemplary embodiment of an inventive multi-channel supply circuit.
Figure 3:
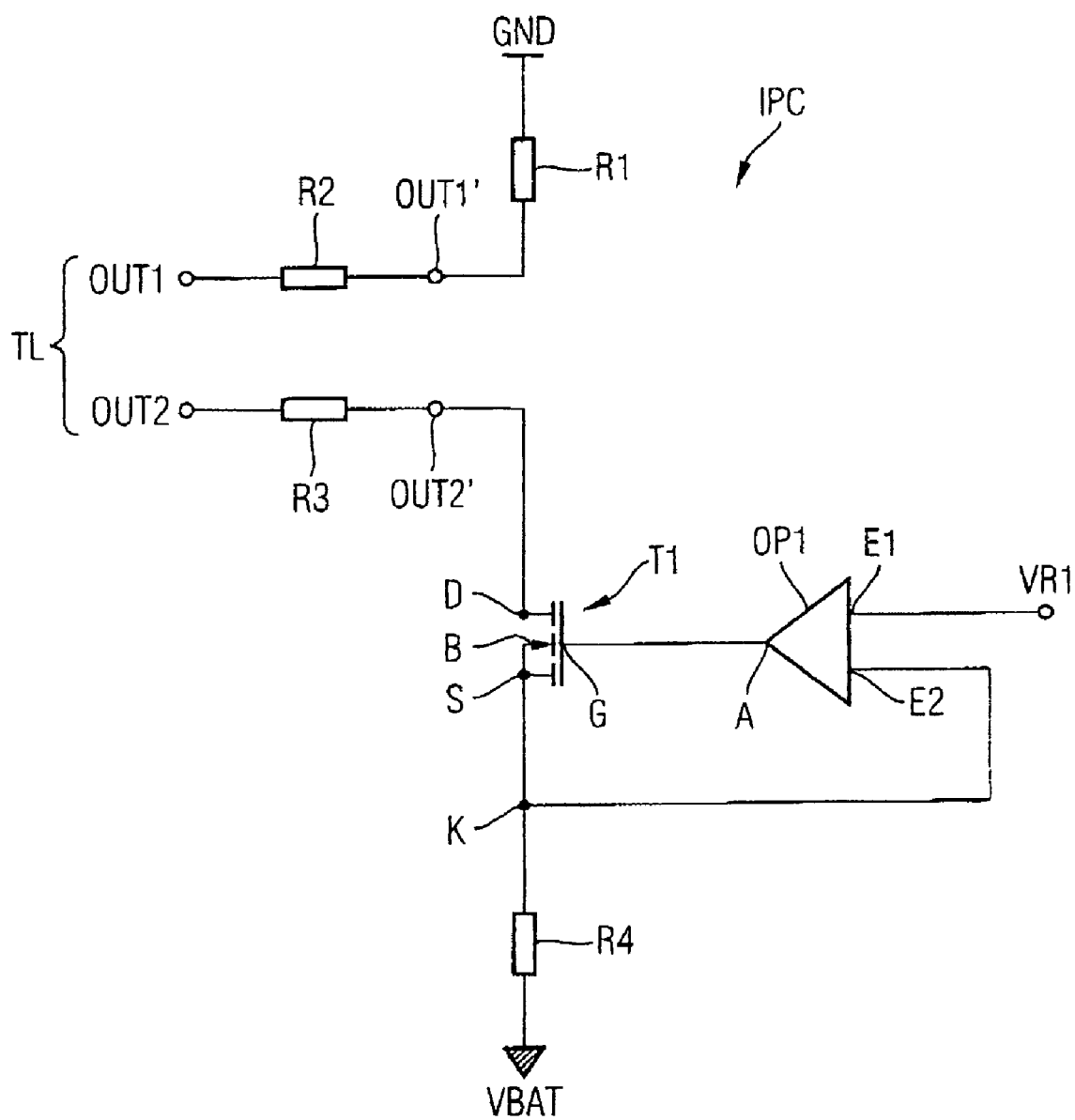
FIG. 3 as discussed above, is a supply circuit in accordance with the prior art.

FIG. 2 illustrates a development of the invention.

A multi-channel supply circuit 21 is depicted, said circuit having a plurality of inventive impedance-matched supply circuits 11-1, . . . , 11-4, each of which is supplied with a first supply voltage potential GND, a second supply voltage potential VBAT and a reference potential VREF. The multi-channel supply circuit 21 is completely integrated and has connections OUT-1, OUT-2, OUT-3, OUT-4 for connection to two-wire lines TL1-TL4. Telephone subscriber lines TL1-TL4 are connected to these connections OUT-1, . . . , OUT-4 via two respective discrete external resistors 2-1, . . . , 2-4, 3-1, . . . , 3-4.

Since a plurality of inventive impedance-matched supply circuits 11-1, . . . , 11-4 are used in the inventive multi-channel supply circuit 21, the small space requirement (in comparison with the prior art) of the individual supply circuits is particularly manifest during integration to form a multi-channel supply circuit. Such a module having an integrated circuit is particularly suited to use in a switching centre for supplying ISDN telephone lines.

Although the present invention has been explained with reference to specific exemplary embodiments, it is not restri0cted thereto but rather can be multifariously modified. The voltage, current and resistance values specified can thus be selected as desired in order to use the supply circuit for two-wire telephone lines, ISDN lines or other communication networks, for example. The first and second transistors used may be designed as desired, in particular in the form of normally off IGFETS, in bipolar configuration or using other MOS technologies.

In summary, the invention provides a supply circuit having symmetrical current limitation, the impedance of which is precisely matched using the impedance which is synthesized in accordance with the invention. The inventive circuit is also particularly expedient in terms of area and can be produced in a simple manner on account of the small number of components used.

Although modifications and changes may be suggested by those skilled in the art, it is the intention of the inventor to embody within the patent warranted heron all changes and modifications as reasonably and properly come within the scope of his contribution to the art.

I claim as my invention:

1. A supply circuit for supplying a two-wire line, comprising:
   a first resistor connected between a first supply voltage potential and a first two-wire line connection of a two-wire line; said first resistor having a first impedance;
   a current-limiting device connected between a second two-wire line connection of said two-wire line and a second supply voltage potential and providing said two-wire line with a limited current on the basis of a variable setting potential; and
   an impedance-matching device connected between said second two-wire line connection and said second supply voltage potential and providing said variable setting potential on the basis of a reference potential and a voltage across said current-limiting device; said impedance-matching device and said current-limiting device forming a second impedance being present at said second two-wire connection; said first and second impedances being equal.

2. The supply circuit of claim 1, wherein said current-limiting device comprises:
   a second resistor;
   a first transistor having a first controllable path and a first gate connection; said first controllable path being connected between said second two-wire line connection and said second supply voltage potential via said second resistor; and
   a first differential amplifier having a first input, a second input, and a first output; said first input being connected to said setting potential, said second input being connected to a first line node between said first controllable path of said first transistor and said second resistor, and said first output being connected to said first gate connection of said first transistor.

3. The supply circuit of claim 2, wherein said first transistor is a self closing IGFET.

4. The supply circuit of claim 1, wherein said impedance-matching device further comprises:
   a first additional resistor;
   a second additional resistor;
   a transistor having a controllable path and a gate connection; said controllable path being connected to a line node between said first additional resistor which is connected to said second two-wire line connection and said second additional resistor which is connected to said second supply voltage potential; and
   a differential amplifier having a first input, a second input and an output, said first input being connected to said line node, said second input being connected to a reference potential, and said output being connected to said gate connection of said transistor; said setting potential being present at said line node.

5. The supply circuit of claim 4, wherein said transistor is a self-closing IGFET, 6. The supply circuit of claim 1, being completely integrated on a chip.

7. The supply circuit of claim 1, wherein said two-wire line is a telephone line.

8. The supply circuit of claim 2, wherein said impedance-matching device comprises:
   a third resistor;
   a fourth resistor;
   a second transistor having a second controllable path and a second gate connection; said second controllable path being connected to a second line node between said third resistor which is connected to said second two-wire line connection and said fourth resistor which is connected to said second supply voltage potential; and
   a second differential amplifier having a third input, a fourth input and a second output, said third input being connected to said second line node, said fourth input being connected to said reference potential, and said second output being connected to said second gate connection of said second transistor; said setting potential being present at said second line node.

9. The supply circuit of claim 8, wherein said first, second, third, and fourth transistors are dimensioned so that said first and second impedances are 28 ohms each.

10. The supply circuit of claim 2, wherein said first transistor has a channel resistance of at least 5 ohms.

11. The supply circuit of claim 8, wherein said first, second, third, and fourth resistors and channel resistances of said first and second transistors are selected in such a manner that the current flowing through said two-wire line is, at most, 50 mA and said voltage between said first supply voltage potential and said second supply voltage potential is 100 volts.

12. The supply circuit of claim 1, being coupled to each of said first and second two-wire line connections via a discrete coupling-in resistor.

13. A multi-channel supply circuit, comprising:
   a plurality of impedance-matched supply circuits of claim 1; said supply circuits being connected in parallel for the purpose of supplying limited currents to a plurality of two-wire lines.

14. The multi-channel supply circuit of claim 13, being completely integrated on a chip.

15. The multi-channel supply circuit of claim 13, being designed for operation in an ISDN network.

* * * * *